US007347373B2

(12) United States Patent
Singh

(10) Patent No.: US 7,347,373 B2
(45) Date of Patent: Mar. 25, 2008

(54) METHOD AND SYSTEM FOR UTILIZING A DIGITAL CAMERA FOR RETRIEVING AND UTILIZING BARCODE INFORMATION

(75) Inventor: Mona Singh, Cary, NC (US)

(73) Assignee: Scenera Technologies, LLC, Portsmouth, NH (US)

(*) Notice: Subject to any disclaimer, the term of this patent is extended or adjusted under 35 U.S.C. 154(b) by 226 days.

(21) Appl. No.: 10/887,287

(22) Filed: Jul. 8, 2004

(65) Prior Publication Data

US 2006/0006238 A1    Jan. 12, 2006

(51) Int. Cl.
*G06K 7/10* (2006.01)
(52) U.S. Cl. .................... 235/462.25; 235/462.01; 235/462.1; 235/462.15; 235/472.01
(58) Field of Classification Search .......... 235/462.25, 235/472.01, 462.1, 462.07, 462.11, 462.24, 235/462.15
See application file for complete search history.

(56) References Cited

U.S. PATENT DOCUMENTS

| 5,764,125 | A  |   | 6/1998 | May ............................ 336/92 |
| 5,878,401 | A  | * | 3/1999 | Joseph ......................... 705/22 |
| 5,923,735 | A  |   | 7/1999 | Swartz et al. |
| 6,122,520 | A  |   | 9/2000 | Want et al. .................. 455/456 |
| 6,595,417 | B2 | * | 7/2003 | O'Hagan et al. ........... 235/383 |
| 6,616,049 | B1 | * | 9/2003 | Barkan et al. .......... 235/472.03 |
| 6,696,922 | B1 |   | 2/2004 | Wong et al. ................. 340/7.32 |
| 6,729,544 | B2 | * | 5/2004 | Navon ...................... 235/462.14 |
| 6,863,218 | B2 | * | 3/2005 | Muramatsu ............. 235/462.25 |
| 6,942,151 | B2 | * | 9/2005 | Ehrhart .................... 235/462.25 |
| 7,156,311 | B2 | * | 1/2007 | Attia et al. ............. 235/462.46 |
| 2002/0002504 | A1 | * | 1/2002 | Engel et al. .................... 705/26 |
| 2002/0111869 | A1 | * | 8/2002 | Shuster et al. ................. 705/23 |
| 2005/0198095 | A1 | * | 9/2005 | Du et al. ...................... 709/200 |

OTHER PUBLICATIONS

Pryor, Robert, "GPS and Barcode Pipe Data Collection," GISdevelopment.net, GIS for Oil & Gas Proceedings 2001, pp. 1-6.

* cited by examiner

*Primary Examiner*—Seung Ho Lee

(57) ABSTRACT

A method and system for utilizing an image capture device for obtaining information relating to an item having a barcode corresponding to a barcode number is described. The method and system includes capturing an image of the barcode and converting the image of the barcode to the barcode number. The barcode number is used to access a category of information related to the item and that may include information for at least one other product having a different barcode number. In another aspect, the method and system include providing information related to the item. In this aspect, data indicating the barcode number is received. The barcode number being determined based on an image captured of the barcode. The barcode is utilized to remotely access the category of information related to the item and including information for at least one other product having a different barcode number. At least a portion of the information is returned.

40 Claims, 3 Drawing Sheets

METHOD AND SYSTEM FOR UTILIZING A DIGITAL CAMERA FOR RETRIEVING AND UTILIZING BARCODE INFORMATION

FIELD OF THE INVENTION

The present invention relates to image capture devices, and more particularly to a method and system for utilizing image capture devices to access and use barcode information.

BACKGROUND OF THE INVENTION

Currently bar codes, such as uniform product codes (UPC), are virtually ubiquitous in their use in identifying a variety of items available in commerce. For example, UPC codes are used are identifying products from groceries to toys or clothes. The barcodes are used both in distinguishing types of products as well as identifying individual products. For example, the barcodes may be used both to distinguish toothpaste from other products such as toothbrushes or clothing, and to distinguish different brands of toothpaste, such as CREST or COLGATE. In general, the barcode printed on an item includes both a series of bars and a text number. The bars graphically represent the number that is also generally, but not always, printed in text.

In order to utilize the barcodes, a variety of conventional barcode readers exist. In some conventional barcode readers, a digital camera or other imaging technology is used to capture an image or otherwise sense the barcode. The barcode is then converted into a barcode number. In conventional settings, the barcode number can then be used to determine characteristics of the specific item to which the barcode corresponds. For example, the price of the particular item or the number of the item in inventory at a particular location can be determined.

Although barcodes and conventional barcodes readers facilitate commerce, one of ordinary skill in the art will readily recognize that current developments in barcode related technology are related to improving the efficiency and encoding of barcodes. The ability of consumers and other user to employ barcodes for purposes other than discovering prices of products remains limited.

Accordingly, what is needed is a method and system for extending the uses of barcodes. The present invention addresses such a need.

BRIEF SUMMARY OF THE INVENTION

The present invention provides a method and system for utilizing an image capture device for obtaining information relating to an item having a barcode corresponding to a barcode number is described. The method and system comprise capturing an image of the barcode and converting the image of the barcode to the barcode number. The barcode is used to access a category of information that is related to the item and that includes information for at least one other product having a different barcode number. In another aspect, the method and system comprise providing information related to the item. In this aspect, data indicating the barcode number is received. The barcode number being determined based on an image captured of the barcode. The barcode is utilized to remotely access a category of information related to the item and at least a portion of the information is returned.

According to the method and system disclosed herein, present invention allows a user to access a variety of information that may otherwise be unavailable, difficult to sort through, or difficult to obtain while viewing the item corresponding to the barcode number.

DETAILED DESCRIPTION OF THE INVENTION

The present invention relates to image capture devices. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for utilizing an image capture device for obtaining information relating to an item having a barcode corresponding to a barcode number is described. The method and system comprise capturing an image of the barcode and converting the image of the barcode to the barcode number. The barcode is used to access a category of information that is related to the item and that includes information for at least one other product having a different barcode number. More specifically, the category of information is deemed related to the original product and relevant to the user's needs. In another aspect, the method and system comprise providing information related to the item. In this aspect, data indicating the barcode number is received. The barcode number being determined based on an image captured of the barcode. The barcode is utilized to remotely access a category of information related to the item and at least a portion of the information is returned.

The present invention will be described in terms of particular methods having certain steps. However, one of ordinary skill in the art will readily recognize that a method in accordance with the present invention can include other and/or additional steps not inconsistent with the present invention. Similarly, the present invention will be described in terms of particular devices, such as cell phones, image capture devices, and server, having certain components. However, one of ordinary skill in the art will readily recognize that methods and systems in accordance with the present invention can include other and/or additional components not inconsistent with the present invention.

Figure 1:
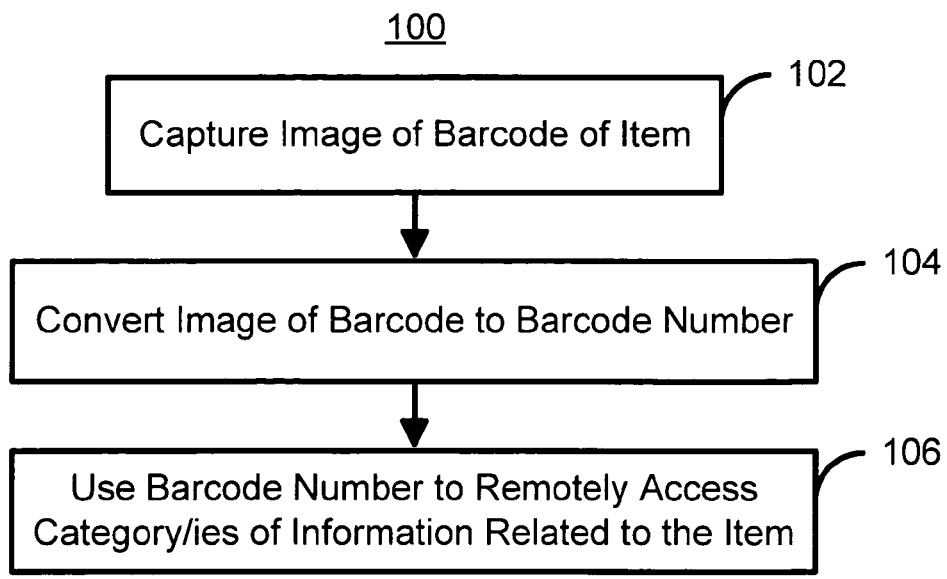
FIG. 1 is high-level flow chart of one embodiment of a method in accordance with the present invention for utilizing and retrieving barcode information.

To more particularly describe the method and system in accordance with the present invention, refer to FIG. 1, depicting a high-level flow chart of one embodiment of a method 100 in accordance with the present invention for utilizing and retrieving barcode information. The method 100 is implemented using a device having both the ability to capture images and communicate, preferably using wireless technology. For example, the method 100 may be performed using a camera phone. The method 100 is also used with one or more items, each of which has a corresponding barcode. The barcode represents a barcode number. In addition, the barcode preferably includes a graphical representation of the barcode number (e.g. the particular set of bars) as well as a text representation of the barcode number.

An image of the barcode from an item is captured, via step 102. In one embodiment, at least the text portion of the barcode and preferably both the graphical portion and the text portion of the barcode are completely within the image captured in step 102. However, the image captured in step 102 may include portions of the item other than the barcode.

The image of the barcode is converted to the barcode number, via step 104. In one embodiment, the text portion of the barcode is converted to the barcode number. In such an embodiment, conventional text recognition modules might be used. In another embodiment, the graphical portion of the barcode or a combination of the graphical and text portions of the barcode might be utilized. Thus, the barcode number corresponding to the item is obtained in step 104.

The barcode number is used to access remote categories of information related to the item, via step 106. Step 106 may be performed by using the telephone portion of the digital camera phone to connect to a service that resides at a location remote from the item and/or user of the device implementing the method 100. In one embodiment, the service would organize information into the categories and include a search engine that can search through the categories of information based upon the barcode number. Furthermore, the categories of information are not limited to the specific product represented by the barcode number. Instead, the categories of information include information for at least one other product having a different barcode number. Thus, the information can include other items the provider of the service has determined are the same or related in nature to the item represented by the barcode number, such as substitute products, coupons, or similar products. For example, if the barcode number is for toothpaste, the categories of information can include related items such as coupons for the particular type of toothpaste, information related to other types of toothpaste, information pertaining to related dental products such as toothbrushes, dental floss or mouthwash, or may position the user within a catalog of goods based upon the barcode number. With respect to substitute products, the barcode may be used to access information about substitute products which are deemed by the service provider to have features that are superior to the item. For example, the category of information could include substitute products having a lower price. The barcode number may also be used to access information used in forming a list, for example by generating a list including related items or substitute items. A user's list may also be updated by removing particular items as they are selected by the user.

Furthermore, the service might include geographic information that can be used in conjunction with the barcode number. For example, the user's account with the service might include a zip code or other geographic location information associated with the user. The service might also obtain the actual geographic location of the sender, for example if the camera phone includes global positioning satellite (GPS) technology or another mechanism for obtaining the geographic location of the camera phone. Based upon the geographic location and the barcode number, specific information may be accessed. For example, the categories of information accessed in step 106 could be reduced to include only those in the same geographic region, for example in the same zip code as, within a particular radius from, or within the same shopping complex as the location of the camera phone being used.

Thus, using the method 100, a user can access a variety of information that may otherwise be unavailable, difficult to sort through, or difficult to obtain while viewing the item corresponding to the barcode number.

Figure 2:
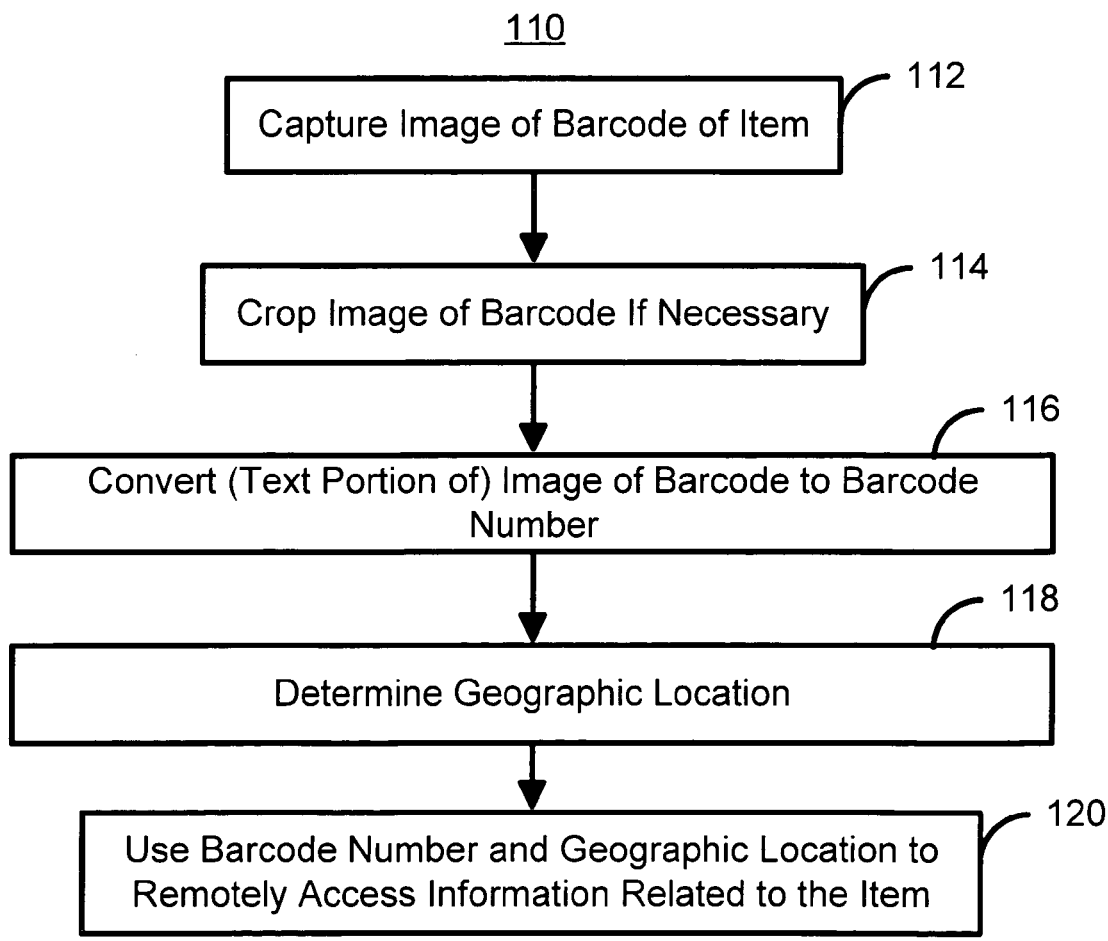
FIG. 2 is a flow chart depicting another embodiment of a method in accordance with the present invention for retrieving and utilizing barcode information.

FIG. 2 is a flow chart depicting another embodiment of a method 110 in accordance with the present invention for retrieving and utilizing barcode information. The method 110 is implemented using a device having both the ability to capture images and communicate, preferably using wireless technology. For example, the method 110 may be performed using a camera phone. The method 110 is thus described in connection with a camera phone. However, nothing prevents the use of other devices not inconsistent with the present invention. The method 110 is also used with one or more items, each of which has a corresponding barcode. The barcode represents a barcode number. In addition, the barcode preferably includes a graphical representation of the barcode number (e.g. the particular set of bars) as well as a text representation of the barcode number.

An image of the barcode from an item is captured using the camera phone, via step 112. In one embodiment, at least the text portion of the barcode and preferably both the graphical portion and the text portion of the barcode are completely within the image captured in step 112. However, the image captured in step 112 may include portions of the item other than the barcode.

Extraneous data that may interfere with the conversion of the image to a barcode number are removed from the image, via step 114. For example, the image may include not only the barcode, but also text on the label of the item in the image. In addition, elements in the background may also appear in the image. More particularly, text that is not part of the barcode is generally cropped in step 114.

The optionally cropped image of the barcode is converted to the barcode number, via step 116. In one embodiment, the text portion of the barcode is converted to the barcode number. In such an embodiment, conventional text recognition modules might be used. Thus, the barcode number corresponding to the item is obtained in step 116.

The geographic location of the camera phone and, therefore, the item are determined, via step 118. The geographic location may be determined using GPS technology, if available in the camera phone. Alternatively, the cell site(s) covering the region in which the camera phone is currently resides may be used to indication the geographic location of the camera phone. In such an embodiment, the geographic location of the camera phone, and thus the item, may be considered to be a larger area corresponding to the cell site(s). Alternatively, the user could enter the desired zip code or be provided with a default zip code based on the user's information. Thus, the geographic location of the item can be obtained in step 118.

The barcode number is used in conjunction with the geographic location to remotely access information related to the item as well as the geographic location, via step 120.

Step 120 includes using camera telephone portion of the digital to connect to a service that resides at a location remote from the item and/or user of the device implementing the method 110. In one embodiment, step 120 is used to access information about substitute products that are deemed to have feature(s) that are superior to the original item, such as a lower price. In one embodiment, the item is for sale at the store and step 120 determines whether a better price may be obtained in the vicinity. For example, the prices of the same or similar items (based on the bar code number) can be obtained for the zip code, within a particular range of the present location or region (based on the geographic information). The user can thus make judgments about whether to buy particular products. Coupons for particular stores in the geographic location can also be provided for the same or similar items. An alternate vendor for the product, particularly a vendor in the same region as the user, could also be determined in step 120.

Thus, using the method 110, a user can access a variety of information and correlate the information with the geographic location of the camera phone and/or item. Otherwise such information may difficult to obtain or organize. Consequently, a user's review of products, for example during shopping, may be improved.

Figure 3:
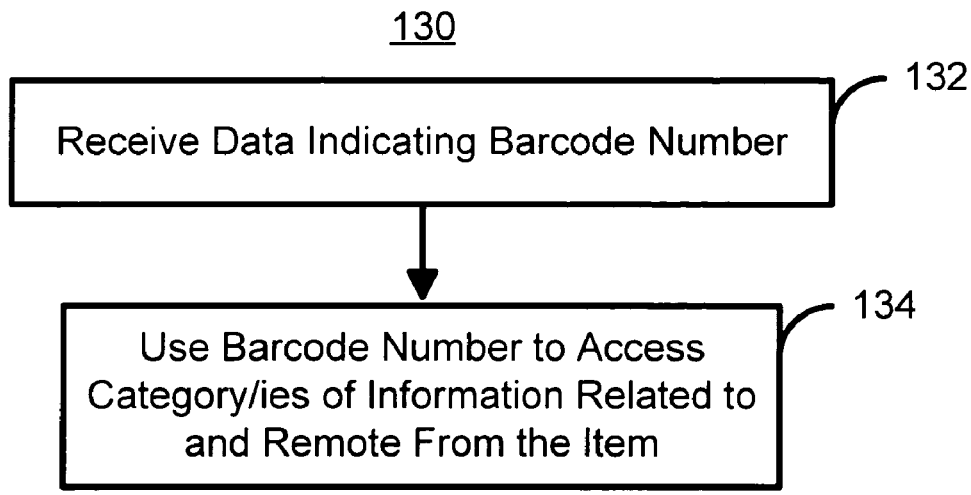
FIG. 3 is a high-level flow chart depicting one embodiment of a method for providing information relating to the barcode to a remote user.

FIG. 3 is a high-level flow chart depicting one embodiment of a method 130 for providing information relating to the barcode to a remote user. The method 130 may be performed by the service to which the user connects and retrieves information in the methods 100 and 110 depicted in FIGS. 1 and 2 and discussed above. Referring to FIG. 3, the data reflecting the barcode number is received by the server system (not explicitly shown) for the service, via step 132. In one embodiment, the barcode number is received, for example from a device performing the method 100 and/or 110. In another embodiment, an image of the barcode might be received. In such an embodiment, the server system may convert the image to the bar code number in step 132 in a similar manner to that which is described above.

The bar code number is then used to access one or more categories of information related to the item represented by the bar code number, via step 134. The categories of information might include other items the provider of the service has determined are the same or related in nature to the item represented by the bar code number, such as substitute products, coupons, or similar products, as described above. The barcode number may also be used to access information used in forming a list stored by the service, for example by generating a list including related items or substitute items. A user's list may also be updated by removing particular items as they are selected by the user. Furthermore, the service might include geographic information that can be used in conjunction with the barcode number. Thus, using the method 130, a use can be provided with a variety of information that may otherwise be unavailable, difficult to sort through, or difficult to obtain while viewing the item corresponding to the barcode number.

Figure 4:
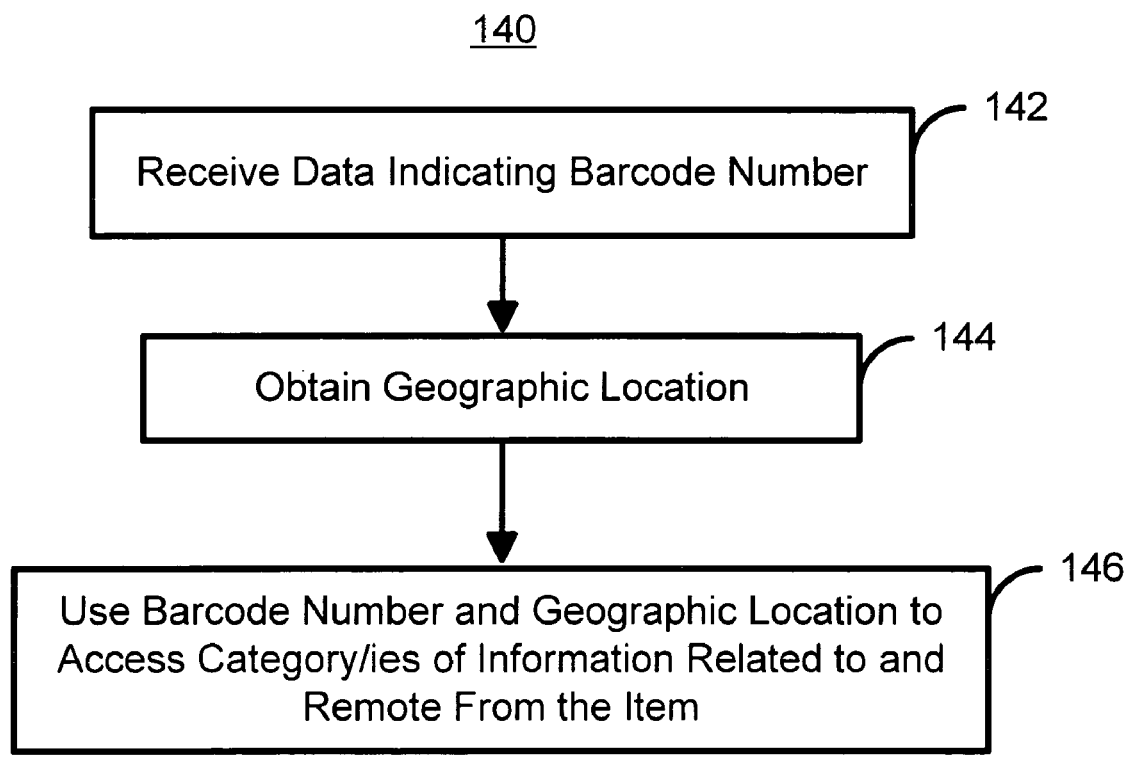
FIG. 4 is a flow chart depicting another embodiment of a method for providing information relating to the barcode to a remote user.

FIG. 4 is a flow chart depicting another embodiment of a method 140 for providing information relating to the barcode to a remote user. The method 140 may be performed by the service to which the user connects and retrieves information in the methods 100 and 110 depicted in FIGS. 1 and 2 and discussed above. Referring to FIG. 4, the data reflecting the barcode number is received by the service, via step 142. In one embodiment, the barcode number is received, for example from a device performing the method 100 and/or 110. In another embodiment, an image of the barcode might be received. In such an embodiment, the server system may convert the image to the bar code number in step 142 in a similar manner to that which is described above.

Geographic location information is obtained, via step 144. In one embodiment, the geographic location is obtained from the camera phone or entered by the user. In another embodiment, the geographic location information may be stored by the service. However, in such a case the geographic location may not accurately reflect the location of the item or the camera phone.

The bar code number and the geographic location are used to access information related to the item represented by the bar code number and related to the geographic location, via step 144. Step 144 preferably also includes returning the information to the sender. The types of information that can be accessed are varied, as discussed above in the methods 100, 110, and 130. For example, the prices of the same or similar items in the vicinity may be obtained. Coupons for particular stores in the geographic location can also be provided for the same or similar items. The user can thus make judgments about whether to buy particular products.

Thus, using the method 140, a use can access a variety of information and correlate the information with the geographic location of the camera phone and/or item. Otherwise such information may difficult to obtain or organize. Consequently, a user's review of products, for example during shopping, may be improved.

Figure 5:
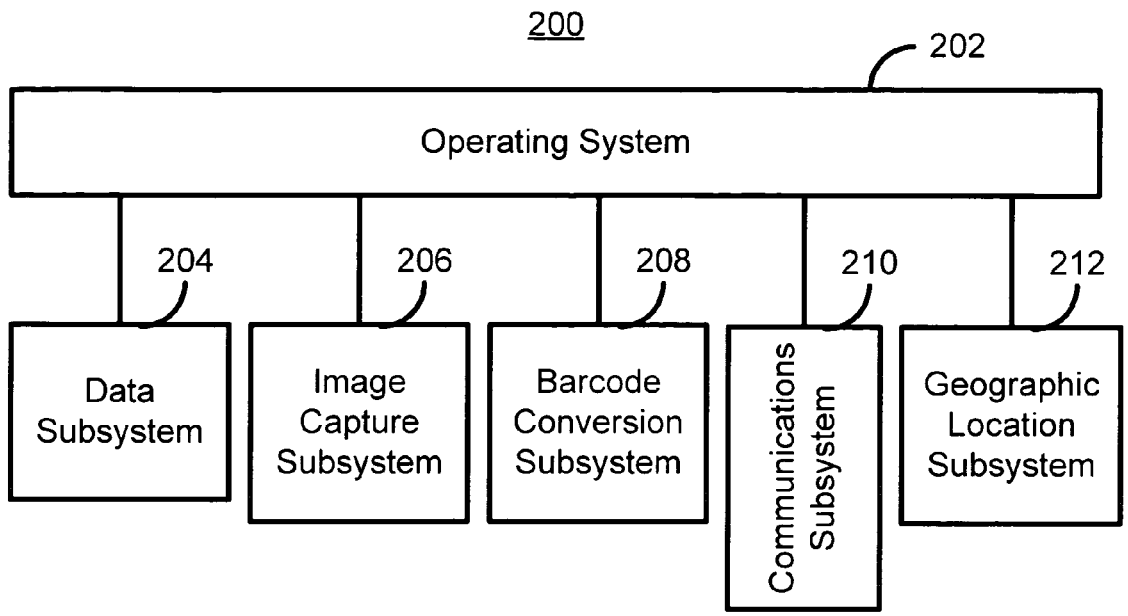
FIG. 5 is a high-level block diagram of one embodiment of an image capture device in accordance with the present invention.

FIG. 5 is a high-level block diagram of one embodiment of an image capture device 200 in accordance with the present invention. The image capture device 200 is preferably used to perform the methods 100 and 110. The image capture device is preferably incorporated into a camera phone. The image capture device 200 includes an operating system 202 for controlling the device. The image capture device 200 also includes a data subsystem 204, an image capture subsystem 206, a barcode conversion subsystem 208, a communications subsystem 210, and in a preferred embodiment, a geographic location subsystem 212. The image capture subsystem 206 is used to capture the image of the barcode. The barcode conversion subsystem 208 is used to convert the image, or a portion thereof, to the barcode number. The barcode conversion subsystem may also be used to determine the geographic location of the sender based upon information received. The communications subsystem 210 is used in operating the telephone portion of the device. The communications subsystem 210 is thus used in accessing a remote service in order to obtain the information related to the item. The geographic location subsystem 212 is preferably either a GPS subsystem or a system that can determine the location of the image capture device 210 in another manner: For example, the geographic location subsystem 212 may use cell site(s) currently being accessed by the image capture device 210. The data subsystem 204 is preferably used in conjunction with the barcode number and, in some embodiments, the geographic location to obtain or organize information for the user. For example, the data subsystem might form queries or otherwise organize information related to the item that is provided. Thus, the image capture device 200 can be used in conjunction with the methods 100, 110, 130, or 140 to provide the user with substantially more information relating to items of interest to the user.

Figure 6:
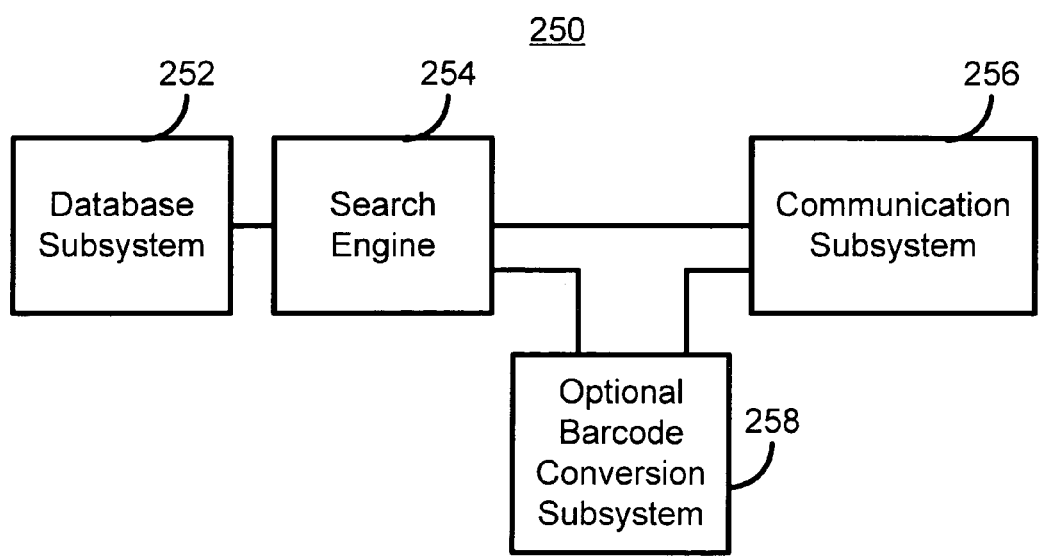
FIG. 6 is a high-level block diagram of a server system in accordance with the present invention.

FIG. 6 is a high-level block diagram of a server system 250 in accordance with the present invention. The server system 250 could be implemented on a single server machine at a particular location or may be distributed over multiple server machines that may reside at disparate physical locations. The server system 250 may implement the methods 130 and/or 140. The server system 250 is used in providing the service which is utilized in steps 106 and 120 of the methods 100 and 110, respectively and described in the methods 110 and 130. The server system 250 includes a database subsystem 252, a search engine 254, and a communication subsystem 256. If the server system converts images to barcode numbers, then a conversion subsystem 258 may also be provided. The database subsystem 252 stores information related to the bar code number. The information stored in the database subsystem 252 is also preferably organized into categories based on relationships between barcode numbers and categories of items defined by the provider of the service. The search engine 254 searches the database subsystem 252 based at least upon the barcode number. Other factors such as geographic location may also be taken into account by the search engine 254. The communications subsystem 256 allows the server system 250 to send and receive communications, for example to and from a camera phone or other image capture device having wireless communication capabilities. Thus, the server system 250 can be used in conjunction with the methods 100, 110, 130, or 140 to provide the user with substantially more information relating to items of interest to the user.

A method and system for retrieving and utilizing bar code information has been disclosed. The present invention has been described in accordance with the embodiments shown, and one of ordinary skill in the art will readily recognize that there could be variations to the embodiments, and any variations would be within the spirit and scope of the present invention. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Accordingly, many modifications may be made by one of ordinary skill in the art without departing from the spirit and scope of the appended claims.

I claim:

1. A method for utilizing an image capture device for obtaining information relating to an item having a barcode corresponding to a barcode number, the method comprising:
    capturing an image of the barcode, wherein the barcode includes a graphical portion and a text portion;
    converting a combination of the graphical portion and the text portion of the captured barcode image to the barcode number; and
    utilizing the barcode number to remotely access a category of information related to the item and including information for at least one other product having a different barcode number.

2. The method of claim 1 wherein the converting step further includes:
    cropping the image to remove a portion of the image not including the barcode if required.

3. The method of claim 1 wherein the barcode utilizing step further includes:
    determining a geographic location of the image capture device; and
    utilizing the geographic location and the bar code number to remotely access at least one category of information related to the item.

4. The method of claim 3 wherein the geographic location utilizing step further includes:
    determining at least one alternative vendor for the same item in a particular geographic region.

5. The method of claim 3 wherein the geographic location utilizing step further includes:
    determining at least one substitute item in a particular geographic region.

6. The method of claim 5 wherein the item has a first price and at least one substitute has a second price lower than the first price.

7. The method of claim 1 further comprising the step of:
    generating at least a portion of a list using the barcode number.

8. The method of claim 1 wherein the category of information further includes at least one substitute item.

9. The method of claim 1 wherein the category of information further includes at least one coupon for the item.

10. The method of claim 1 wherein utilizing the barcode number to remotely access a category of information related to the item and including information for at least one other product having a different barcode number includes identifying a catalog of goods corresponding to the item.

11. The method of claim 1, further comprising removing the item from a list stored in the image capture device.

12. A method for providing information related to an item having a barcode, the barcode corresponding to a barcode number the method comprising:
    receiving an image of the barcode that includes a graphical portion and a text portion;
    converting a combination of the graphical portion and the text portion of the received barcode image to the barcode number;
    utilizing the barcode number to access a category of information related to the item, the information being located remote from the item having the barcode number and including information for at least one other product having a different barcode number or geographic information related to the item; and
    returning at least a portion of the information.

13. A method for providing information related to an item having a barcode, the barcode corresponding to a barcode number the method comprising:
    receiving an image of the barcode that includes a graphical portion and a text portion;
    converting a combination of the graphical portion and the text portion of the received barcode image to the barcode number;
    utilizing the barcode and a geographic location of a sender to access information related to the item the information being located remote from the item having the barcode; and
    returning at least a portion of the information.

14. The method of claim 13 further comprising:
    determining a geographic location of the sender.

15. A computer-readable medium containing a program for utilizing an image capture device for obtaining information relating to an item having a barcode corresponding to a barcode number, the program including instructions for:
    capturing an image of the barcode wherein the barcode includes a graphical portion and a text portion;
    converting a combination of the graphical portion and the text portion of the captured barcode image to the barcode number; and
    utilizing the barcode number to remotely access a category of information related to the item and including information for at least one other product having a different barcode number.

16. The computer-readable medium of claim 15 wherein the converting instructions further include:
cropping the image to remove a portion of the image not including the barcode if required.

17. The computer-readable medium of claim 15 wherein the barcode utilizing instructions further include:
determining a geographic location of the image capture device; and
utilizing the geographic location and the bar code number to remotely access at least one category of information related to the item.

18. The computer-readable medium of claim 17 wherein the geographic location utilizing instructions further include:
determining at least one substitute item in a particular geographic region.

19. The computer-readable medium of claim 18 wherein the item has a first price and the at least one substitute has a second price lower than the first price.

20. The computer-readable medium of claim 15 wherein the program further includes:
generating at least a portion of a list using the barcode number.

21. The computer-readable medium of claim 15 wherein the category of information further includes at least one substitute item.

22. The computer-readable medium of claim 15 wherein the category of information further includes at least one coupon for the item.

23. A computer-readable medium containing a program for providing information related to an item having a barcode, the barcode corresponding to a barcode number the program including instructions for:
receiving an image of the barcode that includes a graphical portion and a text portion;
converting a combination of the graphical portion and the text portion of the received barcode image to the barcode number;
utilizing the barcode to access a category of information related to the item, the information being located remote from the item having the barcode and including information for at least one other product having a different barcode number; and
returning at least a portion of the information.

24. A computer-readable medium containing a program for providing information related to an item having a barcode, the barcode corresponding to a barcode number the program including instructions for:
receiving an image of the barcode that includes a graphical portion and a text portion;
converting a combination of the graphical portion and the text portion of the received barcode image to the barcode number;
utilizing the barcode and a geographic location of a sender to information related to the item, the information being located remote from the item having the barcode and including information for at least one other product having a different barcode number or geographic information related to the item; and
returning at least a portion of the information.

25. The computer-readable medium of claim 24 wherein the program further includes instructions for:
determining a geographic location of the sender.

26. An image capture device for obtaining information relating to an item having a barcode corresponding to a barcode number, the image capture device comprising;

an image capture subsystem for capturing an image of the barcode, wherein the barcode includes a graphical portion and a text portion;
converting a combination of the graphical portion and the text portion of the captured barcode image to the barcode number;
a communication subsystem; and
and a data subsystem for utilizing the barcode number to remotely access a category of information related to the item and including information for at least one other product having a different barcode number.

27. The image capture device of claim 26 wherein the communication subsystem includes a phone.

28. The image capture device of claim 26 wherein the conversion subsystem further crops the image to remove a portion of the image not including the barcode if required.

29. The image capture device of claim 26 further comprising:
a geographic location subsystem for determining a geographic location of the image capture device.

30. The image capture device of claim 29 wherein the geographic location subsystem further includes a global positioning satellite (GPS) subsystem.

31. The image capture device of claim 29 wherein the communication subsystem includes a cellular telephone capable of utilizing a plurality of cell sites, and wherein the geographic location subsystem determines which of a plurality of cell sites currently utilized by the cellular telephone.

32. The image capture device of claim 26 further comprising:
a data subsystem for utilizing the geographic location and the bar code number to remotely access at least one category of information related to the item.

33. The image capture device of claim 32 wherein the data subsystem determines determining at least one substitute item in a particular geographic region.

34. The image capture device of claim 33 wherein the item has a first price and the at least one substitute has a second price lower than the first price.

35. The image capture device of claim 26 further comprising:
generating at least a portion of a list using the barcode number.

36. A server system for providing information related to an item having a barcode, the barcode corresponding to a barcode number, the server system comprising:
a communication subsystem for receiving an image of the barcode that includes a graphical portion and a text portion
a conversion subsystem for converting a combination of the graphical portion and the text portion of the received barcode image to the barcode number;
a database subsystem including a category of information related to the item, the information being accessed based on the barcode number and being remote from the item and including information for at least one other product having a different barcode number; and
a search subsystem for searching the database based upon the barcode number and returning at least a portion of the information.

37. The server system of claim 36 wherein the communication subsystem, the database subsystem, and the search subsystem are distributed over a plurality of servers.

38. The server system of claim 36 wherein the communication subsystem, the database subsystem, and the search subsystem are contained in a particular server.

39. A server system for providing information related to an item having a barcode, the barcode corresponding to a barcode number, the server system comprising:
- a communication subsystem for receiving an image of the barcode that includes a graphical portion and a text portion
- a conversion subsystem for converting a combination of the graphical portion and the text portion of the received barcode image to the barcode number;
- a database subsystem including a category of information related to the item, the information being accessed based on the barcode number and the geographic location and being located remote from the sender; and
- a search subsystem for searching the database based upon the barcode number and a geographic location of the sender returning at least a portion of the information.

40. The server system of claim 39 wherein the device is an image capture device and wherein the image capture device converts the image to the barcode number.

* * * * *